United States Patent Office 3,427,955
Patented Feb. 18, 1969

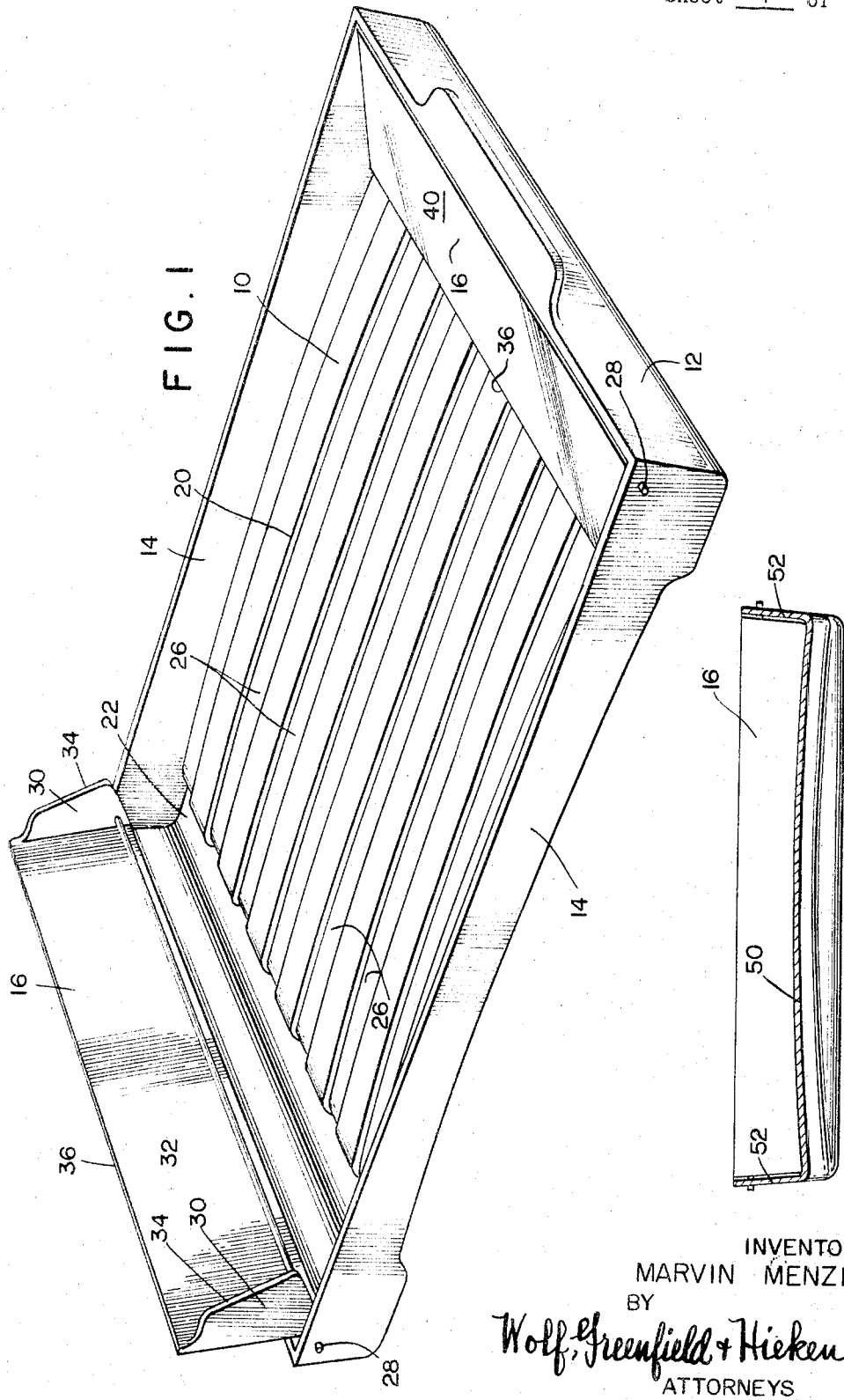

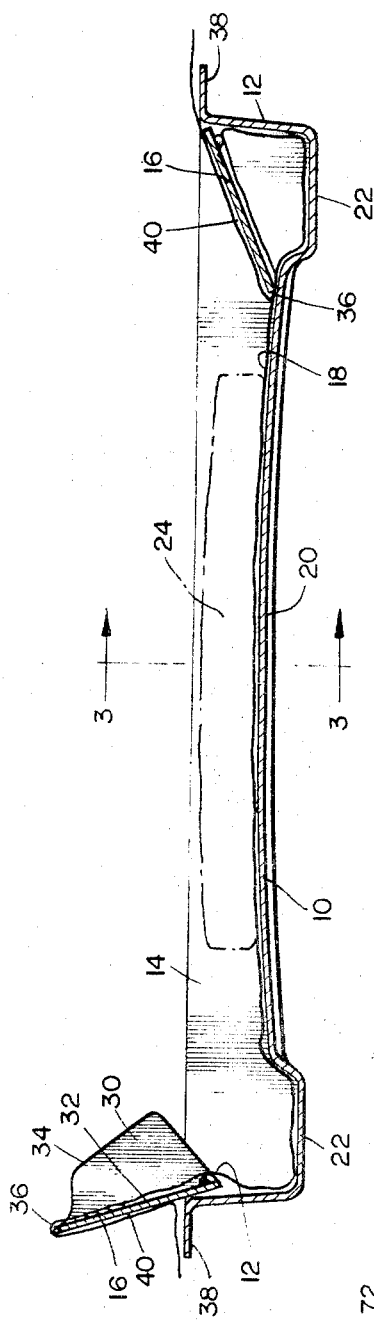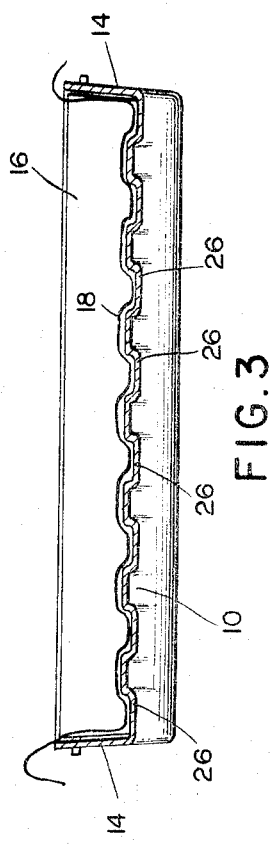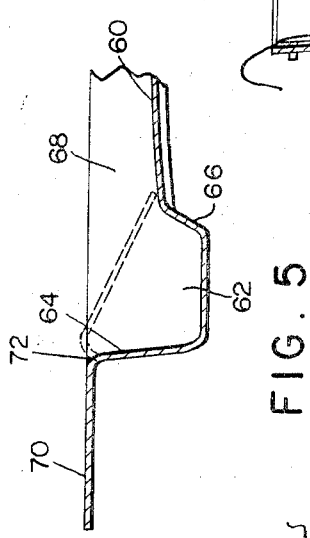

3,427,955
BROILER PAN
Marvin Menzin, 53 Ash St., Waltham, Mass. 02154
Filed Mar. 6, 1967, Ser. No. 620,726
U.S. Cl. 99—425
Int. Cl. A47j *37/10, 27/58;* F24c *3/00*
10 Claims

ABSTRACT OF THE DISCLOSURE

A boiling pan itself disposable or lined with a disposable material or washable and having wells covered by movable radiation shields at each end and a bottom wall that slopes from the center to the troughs to convey the meat juices to the troughs.

---

This invention relates to broiler pans and more particularly comprises a new and improved broiler pan disposable in part or in whole and which reduces the smoke and the hazards from fire ordinarily created by the juices discharged from meat when it is broiled.

Conventional broiler pans sometimes include a trough for collecting the juices of meat prepared in them. Steaks, chops, and other forms of meat give off varying amounts of fats and other materials in liquid form during broiling, and while it is desirable to conserve the juices and fats particularly with certain forms of beef, the juices create considerable smoke during broiling and sometimes their vapors flare when they contact heating coils in the broiler. Thus, the juice may constitute a particular hazard when it is collected in quantity in the trough of the pan.

It is common practice for the housewife in order to make the task of cleaning easier, to line the broiler pan with aluminum foil. After the broiling is complete, the housewife rolls up the foil and discards it with the juices and fats, and hopefully the pan is unsoiled. However, the foil does not eliminate those hazards referred to in the preceding paragraph, and in certain instances may aggregate the problem by reflecting the heat from the broiler coils into the pools of juices.

One important object of this invention is to provide a broiler pan which is specially formed to shield the juices which collect in it so as to reduce smoke and prevent the ignition of the juices which results from the juices vaporizing and coming in contact with the coils or flame in the broiler.

Another important object of this invention is to provide a practical means of eliminating the need for scouring broiler pans after use.

Another object of this invention is to provide means in a broiler pan for facilitating the disposal of juices discharged by meat.

Yet another object of this invention is to provide a broiler pan that has a tilted bottom to cause the flow of the juices to a collecting trough but which provides a platform for meat which holds the meat a substantially uniform distance from the heat source in the broiler.

In accordance with this invention radiation shields are secured to the end walls of the pan, which cover troughs provided at each end to collect the fats and juices. In accordance with one embodiment of this invention the inside of the pan and the shields are covered with foil, and the foil not only protects the pan but further provides a most effective radiating surface over the shields.

These and other objects and features of this invention along with its incident advantages will be better understood and appreciated from the following detailed description of several embodiments thereof, selected for purposes of illustration and shown in the accompanying drawing, in which:

FIG. 1 is a perspective view of a broiler pan constructed in accordance with this invention shown with one shield open and the other closed; and FIG. 2 is a cross sectional view of the pan of FIG. 1 and showing it lined with foil and a loaf of meat in position for broiling; and FIG. 3 is a cross sectional view taken along the line 3—3 of FIG. 1; and FIG. 4 is a view similar to FIG. 3 of another embodiment of this invention; and FIG. 5 is a fragmentary cross sectional view of yet another embodiment of this invention.

The broiler pan shown in FIGS. 1-3 includes a bottom wall 10 opposite end walls 12, opposite side walls 14 and radiation shields 16. A disposable aluminum foil liner 18 is shown to line the pan to keep it clean and enhance the operation of the radiation shields.

The bottom wall 10 in FIG. 2 is shown to be generally curved in cross section so as to provide a crown at the mid-section 20 which slopes to troughs 22 at each end. The troughs 22 define collecting wells at the opposite ends of the bottom wall 10 into which the meat juices may flow, which are discharged or released by the meat as it is being broiled. In FIG. 2 a portion of meat 24 is suggested disposed on the central portion over the crown 20, and it is evident that any juices released by the meat will flow on the bottom wall 10 from the central portion to the troughs 22. In FIG. 3 the bottom wall 10 is shown to be provided with channels 26 that conduct the liquids to the troughs 22. Obviously the configuration of the channels may take any shape so long as they generally extend from the central portion to the troughs 22 in the bottom wall.

Hinge pins 28 are secured to the ends of the top edges of the radiation shields 16 and pivotally connect the shields to the ends of the side walls 14 immediately adjacent the end walls 12. The hinge pins 28 allow the radiation shield to move between the positions shown on the left and right of the broiler pan in FIGS. 1 and 2. That is, the radiation shield 16 on the left of the pan is shown in the raised or elevated position in a substantially vertical plane, while the right shield is shown in the lower position wherein it covers the trough 22 at the end of the bottom wall 10.

Fins 30 are secured to each end of each shield, and extend downwardly from the surface 32 of the shields when the shields are in the closed position as on the right end of the pan shown. The lower edges 34 of the fins 30 conform generally to the shape of the troughs 22 and support the shields in the closed position in a slight inward decline as is evident in the drawings. The lower edges 36 of the shields do not qiute reach the bottom wall 10 when the shields are closed, to allow the juices to flow into the troughs 22.

The aluminum foil liner, 18 is shown in FIG. 2 to cover the entire upper surface of the bottom wall, the inner surfaces of the side walls 14 and the end walls 12, both surfaces of the radiation shields 16, both surfaces of the fins 30 and the handles 38. Thus, the left shield 16 in FIG. 2 is shown to be covered on the surface 32 as well as on the left surface 40 by the liner 18. The liner is obviously placed in the pan with the shields in their raised positions and the ends of the liner are folded down about the outside of the shields and the handles to cover them. The side edges of the liner extend over the tops of the side walls and should be wide enough to cover the side walls when the liner is contoured to the pan. Thereafter the shields may be lowered to the position shown on the right side of FIGS. 1 and 2 and the liner completely lines the surfaces of the troughs 22 made up of the bottom wall 10, inner surfaces of the end walls 12, surfaces 32 of the shields 16 and the inner surfaces of the side walls 14. In addition, the ends of the liner 18 form covers for the upper surfaces 40 of the shields 16 and the handles 38.

It may also be noted in the drawing that when a liner is placed on the bottom wall 10 of the pan it more or less conforms to the shape of the channels 26 to allow the channels to function so as to transport the juices from the central portion of the bottom wall 10 to the troughs 22. In his connection, it will be noted that the edges 36 of the shields are spaced from the bottom wall 10 of the pan when the shields are folded to their operative position as shown on the right of FIG. 2. Furthermore, the fins 30 on each end of the shields push the foil down into the troughs so that it conforms to the trough shape. As the shields are lowered the foil is generally pushed down into the troughs across their width, and the fins serve to anchor it in place. It is desirable that when the liner is placed on the bottom of the pan that the user generally press the foil into the channels as well so that they perform their desired function.

The inclined position of the shields toward the bottom of the pan when they are in the operative position serves to cause the juices from meat in the pan, that rests in part on the shields to flow down to the bottom wall 10 and then into the troughs 22.

It is apparent that when the pan is used, the juices discharged from the meat will flow into the lined troughs 22 and be retained there below the shields 16. The shields 16 and particularly the aluminum lining on their upper surfaces reflect the heat directed downwardly towards the troughs and shields the material in the troughs from direct radiant energy. Thus, the juices in the troughs will not readily boil, vaporize and spread throughout the boiler enclosure and cause smoke or ignite. After the broiling is completed and meat removed, the aluminum lining from above the shields and handle may be bent over the foil on the bottom wall 10 and the foil on the side walls can be bent inwardly to form a closed package to discard the juice and solids that may have collected. Alternatively, after the meat is removed, the juices may be poured from the troughs and the aluminum foil will keep the pan clean. When the foil is removed, the pan should be substantially free of any stains.

The two troughs, one at each end of the pan, provide substantial advantage over a single trough disposed at one end, which is sometimes found in the prior art. By providing troughs at each end, we may have twice the slope from the highest area to each trough as compared to a pan having a trough at but one end, for an equivalent variation in the height of the meat from the burner. Typically the slope may be 1″ vertical to 6″ horizontal.

It should be noted that while the foregoing description suggests that the foil is to be shaped to the pan by the user when it is placed on it, it is within the scope of this invention that the foil be preformed by the manufacturer and sold to the consumer in condition to be readily placed in the pan without further shaping or other alteration. Moreover, it is contemplated that the foil supplier may provide the customer with an inexpensive male mold for the pan which would enable the user to quickly shape the sheet foil herself.

The embodiment of FIG. 4 differs from the pan of FIG. 1–3 only in the configuration of the bottom wall. Thus, in FIG. 4, the bottom wall 50 does not include channels, but rather is humped widthwise so that the juices from the meat will have a tendency to flow to the base of the side walls 52 and then into the troughs at the ends. Thus if several pieces of meat are in the pan, one will not tend to form a dam and prevent the juices of another piece of meat from flowing into the trough. It is also contemplated that channels be provided at the base of the side walls 52 to more directly convey the juices to the troughs.

In FIG. 5 yet another alternative is suggested. The figure illustrates a pan substantially the same shape as the pan of FIG. 1 but made of a relatively heavy gage of aluminum foil which is self supporting but inexpensive enough so that the pan itself may be disposable and eliminate the need for a foil liner. In such an arrangement it is particularly desirable that the disposable pans be nestable with other identical pans so that they may be packaged and stored conveniently. For this purpose it will be noted that the bottom wall 60 of the pan is provided with troughs 62 (one shown) defined by upwardly flared side walls 64 and 66, and the pan side wall 68 is also upwardly flared. The radiation shield 70 is shown in the open position, and may be bent about the fold 72 which serves as the hinge, to the closed position assumed by the right shield in FIGS. 1 and 2. When the pan shields are open, it is apparent that identical pans may be nested one upon the other.

Nesting may also be readily incorporated as a feature of the pan of FIGS. 1–3 merely by transferring the hinge connection between radiation shields and the side walls to the top of the walls 12 and flaring the fins 30. Further, if the foil is preformed for the pan, as suggested above, the foil should be nestable to enable a number of liners to be packaged in a small bundle.

With the foregoing description those skilled in the art will appreciate that numerous modifications may be made of this invention without departing from its spirit. For example, the pan may be reusable and not include a throw-away liner, but in this arrangement the pan is preferably coated with a surface that is readily cleanable.

What is claimed is:
1. A broiler pan comprising,
 bottom and side walls,
  said bottom wall sloping downwardly from a higher portion to at least one relatively low end of the pan with a transverse trough at the low end for collecting the juices of food being broiled in the pan,
  and a radiation shield pivotally mounted on the side walls above said trough and movable between a first position wherein the trough is exposed and a second position wherein the trough is covered, said shield in the second position sloping downwardly toward the bottom wall of the pan and forming a continuation thereof so that food disposed on the bottom wall can overlap and be supported by the shield, said shield having sufficient rigidity for that purpose.

2. A broiler pan as described in claim 1 further characterized by,
 a disposable foil liner covering the bottom wall and extending upwardly on the side walls with a portion of the foil covering the shields.

3. A broiler pan as described in claim 2 further characterized by
 said foil liner being preformed to conform to the shape of the pan.

4. A broiler pan as described in claim 1 further characterized by
 said bottom wall being higher at the center and sloping downwardly to lower portions at each end with a transverse trough at each end and each trough having a radiation shield as defined.

5. A broiler pan as described in claim 4 further characterized by
 a handle provided on opposite side walls adjacent the shields.

6. A broiler pan as described in claim 4 further characterized by
 said bottom wall having longitudinally extending channels for conveying the meat juices from the central portion to the troughs.

7. A broiler pan as described in claim 4 further characterized by
 said bottom wall being transversely crowned for causing the juices to flow to the side walls and into the troughs.

8. A broiler pan as described in claim 4 further characterized by said side walls and troughs being flared upwardly to enable the pan to be nested with other identical pans.

9. A broiler pan comprising
bottom and side walls,
said bottom wall sloping downwardly from its higher central portion to opposed relatively low ends of the pan with transverse troughs at each low end for collecting the juices of food being broiled in the pan, and radiation shields pivotally mounted on the side walls above each trough and movable between first positions wherein the troughs are exposed and second positions wherein the troughs are covered, said shields in the second position sloping downwardly toward the bottom wall of the pan,
and fins carried by the shields and extending downwardly into the troughs to support the shields in the second position with the lower edges of the shields when in the second position spaced from the lower wall of the pan.

10. A broiler pan comprising
bottom and side walls,
said bottom wall sloping downwardly from its higher central portion to opposed relatively low ends of the pan with transverse troughs at each low end for collecting the juices of food being broiled in the pan, and radiation shields pivotally mounted on the side walls above each trough and movable between first positions, wherein the troughs are exposed and second positions wherein the troughs are covered, said shields in the second position sloping downwardly toward the bottom wall of the pan, a disposable foil liner covering the bottom wall and extending upwardly on the side walls with a portion of the foil covering the shields,
fins carried by the shields and extending downwardly into the troughs to support the shields in the second position with the lower edges of the shields when in the second position spaced from the lower wall of the pan,
said fins holding the foil liner in the troughs when the fins are in the second position,
said foil covering the bottom and side walls of the pan and both sides of the shields.

References Cited

UNITED STATES PATENTS

| 1,732,910 | 10/1929 | Possons | 99—425 |
| 2,012,520 | 8/1935 | Rogers | 99—425 |
| 2,512,287 | 6/1950 | Schneider | 99—425 |
| 2,849,949 | 9/1958 | Trachtman | 99—425 |
| 2,880,716 | 5/1959 | Brodbeck | 126—41 |
| 3,082,757 | 3/1963 | Hohe | 99—445 XR |
| 3,236,403 | 2/1966 | Steinberg | 99—444 XR |

WALTER A. SCHEEL, *Primary Examiner.*

J. M. NEARY, *Assistant Examiner.*

U.S. Cl. X.R.

99—444